(12) United States Patent
Sloop et al.

(10) Patent No.: US 9,547,987 B2
(45) Date of Patent: *Jan. 17, 2017

(54) METHOD AND APPARATUS FOR CONVEYING VEHICLE DRIVING INFORMATION

(71) Applicant: Earth Networks, Inc., Germantown, MD (US)

(72) Inventors: Christopher Dale Sloop, Mount Airy, MD (US); Robert S. Marshall, Ijamsville, MD (US)

(73) Assignee: Earth Networks, Inc., Germantown, MD (US)

(*) Notice: Subject to any disclaimer, the term of this patent is extended or adjusted under 35 U.S.C. 154(b) by 327 days.

This patent is subject to a terminal disclaimer.

(21) Appl. No.: 14/181,903

(22) Filed: Feb. 17, 2014

(65) Prior Publication Data

US 2014/0225750 A1    Aug. 14, 2014

Related U.S. Application Data

(63) Continuation of application No. 12/646,628, filed on Dec. 23, 2009, now Pat. No. 8,655,951.

(51) Int. Cl.
*G08G 1/09* (2006.01)
*G08G 1/0967* (2006.01)
*G01C 21/36* (2006.01)

(52) U.S. Cl.
CPC ..... *G08G 1/096775* (2013.01); *G01C 21/3691* (2013.01); *G08G 1/096716* (2013.01); *G08G 1/096741* (2013.01)

(58) Field of Classification Search
CPC ............... G08G 1/096775; G08G 1/096716; G08G 1/096741; G01C 21/3691
See application file for complete search history.

(56) References Cited

U.S. PATENT DOCUMENTS 5,343,206 A    8/1994 Ansaldi et al.
5,357,438 A    10/1994 Davidian
(Continued)

FOREIGN PATENT DOCUMENTS

EP    1321742    6/2003
WO    2008100010    8/2008

OTHER PUBLICATIONS

D. Van Sickle, "Down the Road: Acura teams with XM Satellite for driving weather forecasts," SFGate.com, Aug. 2, 2008—2 pages.
(Continued)

*Primary Examiner* — Ario Etienne
*Assistant Examiner* — Blake Rubin
(74) *Attorney, Agent, or Firm* — Proskauer Rose LLP

(57) ABSTRACT

Described are methods and apparatuses, including computer program products, for conveying vehicle driving information. A server computing device generates a hazard index for a plurality of road segments in a predefined coverage area. The server computing device determines a current hazard value for each of the plurality of road segments based on (i) weather conditions data associated with the road segments, (ii) road conditions data associated with the road segments, and (iii) physical attributes of the road segments. The server computing device determines a predicted hazard value for each of the plurality of road segments and assigns the present hazard value and predicted hazard value to the corresponding road segment. The server computing device receives location data associated with a remote device and transmits hazard information associated with one or more of the plurality of road segments based on the location data and the hazard index.

47 Claims, 5 Drawing Sheets

(56) References Cited

U.S. PATENT DOCUMENTS

| | | | |
|---|---|---|---|
| 6,085,147 | A | 7/2000 | Myers |
| 6,252,539 | B1 | 6/2001 | Phillips et al. |
| 6,256,577 | B1 | 7/2001 | Graunke |
| 6,476,731 | B1 | 11/2002 | Miki et al. |
| 6,480,783 | B1 | 11/2002 | Myr |
| 6,542,812 | B1 | 4/2003 | Obradovich et al. |
| 6,650,948 | B1 | 11/2003 | Atkinson et al. |
| 6,753,784 | B1 | 6/2004 | Sznaider et al. |
| 6,829,532 | B2 | 12/2004 | Obradovich et al. |
| 6,965,325 | B2 | 11/2005 | Finnern |
| 7,275,089 | B1 | 9/2007 | Marshall et al. |
| 7,602,285 | B2 | 10/2009 | Sznaider et al. |
| 7,706,965 | B2 | 4/2010 | Downs et al. |
| 7,831,380 | B2 | 11/2010 | Chapman et al. |
| 7,847,708 | B1 * | 12/2010 | Jones .................. G01W 1/02 340/905 |
| 7,899,611 | B2 | 3/2011 | Downs et al. |
| 8,108,141 | B2 | 1/2012 | Ehrlacher |
| 2003/0095639 | A1 | 5/2003 | Vinson |
| 2004/0022416 | A1 | 2/2004 | Lemelson et al. |
| 2004/0143385 | A1 | 7/2004 | Smyth et al. |
| 2007/0159355 | A1 | 7/2007 | Kelly et al. |
| 2008/0147253 | A1 * | 6/2008 | Breed ................ B60W 30/16 701/3 |
| 2008/0189226 | A1 | 8/2008 | Wurster |
| 2009/0091439 | A1 | 4/2009 | Sekiyama et al. |
| 2009/0259360 | A1 * | 10/2009 | Petricoin, Jr. .......... G01C 21/26 701/31.4 |
| 2010/0094532 | A1 | 4/2010 | Vorona |

OTHER PUBLICATIONS

"XM NavWeather™ overview," retrieved from http://www.xmradio.com/navweather/ on Jan. 26, 2009—1 page.

International Search Report and Written Opinion from PCT Application No. PCT/US2010/061791 dated Feb. 28, 2011, 8 pgs.

European Search Report from corresponding European patent application 10840117.5 dated May 13, 2013, 8 pages.

Non-Final Office Action to U.S. Appl. No. 12/646,628 dated May 15, 2012, 15 pages.

Final Office Action to U.S. Appl. No. 12/646,628 dated Jan. 4, 2013, 17 pages.

Notice of Allowance to U.S. Appl. No. 12/646,628 dated Dec. 5, 2013, 11 pages.

* cited by examiner

402

404

METHOD AND APPARATUS FOR CONVEYING VEHICLE DRIVING INFORMATION

RELATED APPLICATIONS

This application is a continuation of U.S. patent application Ser. No. 12/646,628, filed Dec. 23, 2009, the entirety of which is incorporated herein by reference.

FIELD OF THE INVENTION

The subject matter of this application relates generally to methods and apparatuses, including computer program products, for conveying vehicle driving information.

BACKGROUND

Reporting of current and forecast weather conditions has become one of the most important and relied-upon sources of information for many drivers in understanding and responding to hazardous driving conditions. Access to up-to-date and accurate severe weather bulletins helps a driver prepare for severe weather, plan an alternate route of travel while in his vehicle, or enables him to avoid driving altogether if the conditions are too dangerous.

Currently, a popular source of this type of driving information is the radio. Drivers tune in to local stations and receive intermittently-scheduled weather summaries for their area. While radio stations provide easy-to-understand weather reports, there is often a fairly substantial lag time between when a weather event occurs and when that event is reported over the air. Also, radio reports may not be localized to the specific road on which a driver is currently traveling. The delay can be costly to a driver who ends up in the middle of an intense thunderstorm when he could have easily altered his route upon receiving the incident information even a few minutes or seconds earlier.

Recently, more vehicles have been equipped with global positioning systems (GPS), which offer a precise depiction of the current location of the vehicle along with a representation of surrounding roads and points of interest. Most models also include audible, turn-by-turn directions to assist the driver in reaching his intended destination. Some GPS devices can also integrate limited weather information, such as radar maps, into their display. However, the data offered by GPS devices often does not display a simple message to the user as related to weather-related driving conditions.

Another drawback to the above-mentioned sources of weather information is the lack of a hazard index based on both the weather conditions, road conditions, and physical road attributes. When utilized in conjunction with weather information, road conditions and physical road attributes are a valuable factor in giving a clearer indication of the potential for hazardous driving. For example, a road facing directly toward the sun can be considered more dangerous than a road facing away from the sun. Further, a section of road composed of gravel may be considered more hazardous than a freshly-paved asphalt section. In another example, a road covered with a layer of ice or slush can be considered more dangerous than a road that is clean and dry. However, the current sources of information may not have access to road conditions data and physical road attributes data, thereby omitting a crucial factor for an accurate determination of road hazards.

SUMMARY

In light of the above concerns, it would be desirous to develop a system that provides real-time, accurate reporting of hazardous road conditions to a driver based on the convergence of weather, location, road conditions, and physical road attributes.

The invention, in one aspect, features a computerized method for conveying vehicle driving information. A server computing device generates a hazard index for a plurality of road segments in a predefined coverage area, where the hazard index indicates a level of driving safety. The server computing device determines a current hazard value for each of the plurality of road segments based on (i) weather conditions data associated with the road segments, (ii) road conditions data associated with the road segments, and (iii) physical attributes of the road segments. The server computing device determines a predicted hazard value for each of the plurality of road segments, where the predicted hazard value is based on the weather conditions data associated with the road segments, the road conditions data associated with the road segments, and the physical attributes of the road segments, the predicted hazard value representing a level of driving safety for the road segment at a future point in time. The server computing device assigns the present hazard value and the predicted hazard value to the corresponding road segment. The server computing device receives location data associated with a remote device. The server computing device transmits, to the remote device, hazard information associated with one or more of the plurality of road segments based on the location data and the hazard index.

The invention, in another aspect, features a system for conveying vehicle driving information. The system includes a server computing device configured to generate a hazard index for a plurality of road segments in a predefined coverage area, where the hazard index indicates a level of driving safety. The server computing device is configured to determine a current hazard value for each of the plurality of road segments based on (i) weather conditions data associated with the road segments, (ii) road conditions data associated with the road segments, and (iii) physical attributes of the road segments. The server computing device is configured to determine a predicted hazard value for each of the plurality of road segments, where the predicted hazard value is based on the weather conditions data associated with the road segments, the road conditions data associated with the road segments, and the physical attributes of the road segments, the predicted hazard value representing a level of driving safety for the road segment at a future point in time. The server computing device assigns the present hazard value and the predicted hazard value to the corresponding road segment. The server computing device receives location data associated with a remote device and transmits, to the remote device, hazard information associated with one or more of the plurality of road segments based on the location data and the hazard index.

The invention, in another aspect, features a computer program product, tangibly embodied in a non-transitory computer readable storage medium, for conveying vehicle driving information. The computer program product includes instructions operable to cause a server computing device to generate a hazard index for a plurality of road segments in a predefined coverage area, wherein the hazard index indicates a level of driving safety. The computer program product includes instructions operable to cause the server computing device to determine a current hazard value for each of the plurality of road segments based on (i) weather conditions data associated with the road segments, (ii) road conditions data associated with the road segments, and (iii) physical attributes of the road segments. The computer program product includes instructions operable to cause the server computing device to determine a predicted hazard value for each of the plurality of road segments, where the predicted hazard value is based on the weather conditions data associated with the road segments, the road conditions data associated with the road segments, and the physical attributes of the road segments, the predicted hazard value representing a level of driving safety for the road segment at a future point in time. The computer program product includes instructions operable to cause the server computing device to assign the present hazard value and the predicted hazard value to the corresponding road segment. The computer program product includes instructions operable to cause the server computing device to receive location data associated with a remote device and transmit, to the remote device, hazard information associated with one or more of the plurality of road segments based on the location data and the hazard index Any of the above aspects can include one or more of the following features. In some embodiments, generating a hazard index includes assigning a system-defined identifier to each of the one or more road segments to allow the server computing device to execute data transactions associated with an individual road segment. In some embodiments, the server computing device generates a hazard zone based on the hazard index, where the hazard zone comprises a geographical area in proximity to a weather event. In some embodiments, the hazard information is transmitted to the remote device when the received location data is associated with a road segment within the hazard zone.

In some embodiments, the geographical area includes locations at a predetermined distance from the location of the weather event. In some embodiments, the hazard index is updated at regular intervals. In some embodiments, the hazard index is updated every minute In some embodiments, the hazard information includes one or more hazard values, one or more alert messages, one or more graphical representations of the road segments, or any combination thereof.

In some embodiments, the one or more graphical representations include a road map. In some embodiments, the road map includes one or more road segments colored to indicate the assigned hazard value.

In some embodiments, the one or more graphical representations include a grid. In some embodiments, the grid includes one or more sections colored to indicate the assigned current hazard value. In some embodiments, the grid includes one or more sections colored to indicate the assigned future hazard value.

In some embodiments, the one or more graphical representations includes a text table. In some embodiments, the text table includes driving directions colored to indicate the assigned current hazard value. In some embodiments, the text table includes driving directions colored to indicate the assigned future hazard value.

In some embodiments, the weather conditions data includes a time value associated with a weather event. In some embodiments, the road segments represent segments of major highways and secondary highways. In some embodiments, the server computing device stores the hazard index in a storage device.

In some embodiments, the server computing device determines one or more travel routes based upon the hazard index and transmits to the remote device, the one or more travel routes. In some embodiments, the server computing device ranks the one or more travel routes according to the present hazard values and the future hazard values assigned to the road segments that comprise the travel route. In some embodiments, the server computing device transmits one or more travel routes that are assigned future hazard values falling below a predetermined threshold. In some embodiments, the server computing device updates the one or more travel routes based upon changes occurring over time to the present hazard values and the future hazard values and transmits the updated travel routes to the remote device.

Further features and advantages of the present invention as well as the structure and operation of various embodiments of the present invention are described in detail below with reference to the accompanying drawings.

DETAILED DESCRIPTION

In general overview, the techniques described below includes methods and apparatuses that are for conveying vehicle driving information. The techniques are related to seamlessly integrating multiple sources of data associated with driving conditions for delivery to a remote device. The techniques achieve the important advantage of converting complicated weather, road condition, and physical road attributes into an easy-to-understand format, and presenting a real-time indication of the driving conditions of one or more road segments associated with a remote device upon receiving a request from the device, thereby allowing users to quickly evaluate the driving safety of a particular road or travel route.

One aspect of the present techniques is the incorporation of physical road attributes (e.g., topography, solar orientation, road surface composition) into the determination of driving safety, adding another layer of granularity for drivers seeking the most complete information. Overlooked in previous methods and systems, awareness of the physical road attributes can have a dramatic impact on lessening or increasing the risk of dangerous driving conditions, when coupled with other sources of driving information. The techniques offer the ability to simulate a driving decision that the driver would need to make, and providing information related to the decision for the driver's evaluation. Another aspect of the present techniques is the consolidation of weather conditions data, road conditions data, and physical road attributes into a harmonized and effective single-source tool for drivers to assess travel conditions proactively, and also to receive timely alerts and status updates upon request so the drivers can make safer driving decisions while out on the road.

Figure 1:
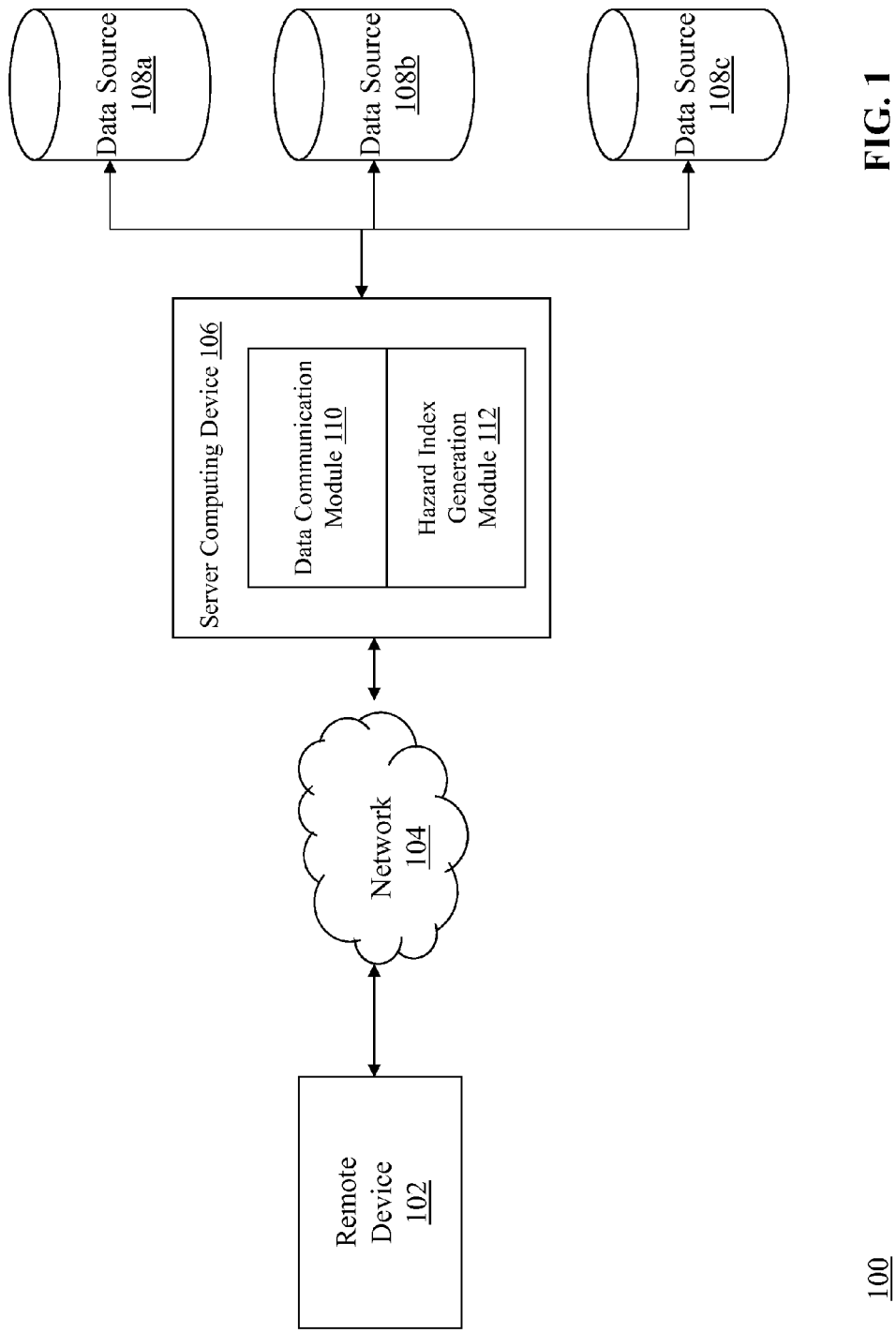
FIG. 1 is a block diagram of an exemplary system for conveying vehicle driving information, according to an illustrative embodiment of the invention.

FIG. 1 is a block diagram of an exemplary system 100 for conveying vehicle driving information, according to an illustrative embodiment of the invention. The system 100 includes a remote device 102, a communications network 104, a server computing device 106, and one or more data sources 108a-108c. In some embodiments, the server 106 and data sources 108a-108c reside at the same physical location or may be dispersed to multiple physical locations. In some embodiments, the server 106 and data sources 108a-108c are located on the same physical device. In other embodiments, one or more of the data sources 108a-108c are distributed over many devices. The server 106 and data sources 108a-108c communicate via a communications network, for example the communications network 104.

The remote device 102 is the hardware that displays the vehicle driving information to the user. Example devices take on many forms, including but not limited to a global positioning system (GPS) device, a smart phone, a personal computer, an internet appliance, a personal navigation device, an in-car dash computer, a set-top box, or the like. In some embodiments, the remote device 102 is located in or installed in a vehicle. The remote device 102 includes network-interface components to enable the user to connect to a communications network 104, such as the Internet. The remote device 102 also includes application firmware or software to generate a visual representation of the vehicle driving information. In some examples, the application software can be browser software such as Microsoft® Internet Explorer, Mozilla Firefox®, or other similar software applications. The remote device 102 also communicates with a display for presenting the vehicle driving information to the user.

The communications network 104 channels communications from the remote device 102 to the server 106. The network 104 may be a local network, such as a LAN, or a wide area network, such as the Internet or the World Wide Web. The network 104 may utilize satellite communications technology. For example, the remote device 102 may send and receive information via a communications link to a satellite, which in turn communicates with the server 106. The remote device 102 and the server 106 transmit data using a standard transmission protocol, such as XML, SMS, or other similar data communication techniques.

The server 106 includes a data communication module 110 which receives location information from the remote device 102 and sends vehicle driving information to the remote device 102. The data communication module 110 also communicates with the data sources 108a-108c to retrieve weather conditions data, road conditions data, physical road attribute data, and other similar information. The server also includes a hazard index generation module 112 to be used in generating a hazard index for the one or more road segments. The data sources 108a-108c need not be computing devices hosting database applications, as in the traditional sense. In some embodiments, the data sources 108a-108c are communication links to sensors, radars or other devices which can transmit data directly to the server 106 as that data is collected. The sensors can be fixed in one place or installed in vehicles or other transitory apparatuses. In some embodiments, the data sources 108a-108c are data feeds received from various governmental and/or commercial entities which collect and make the requisite data available for retrieval by the server 106. In some embodiments, the data sources 108a-108c are computing devices hosting database applications. The number of data sources 108a-108c in FIG. 1 is only provided as one example; the server 106 can communicate with any number of data sources.

Figure 2:
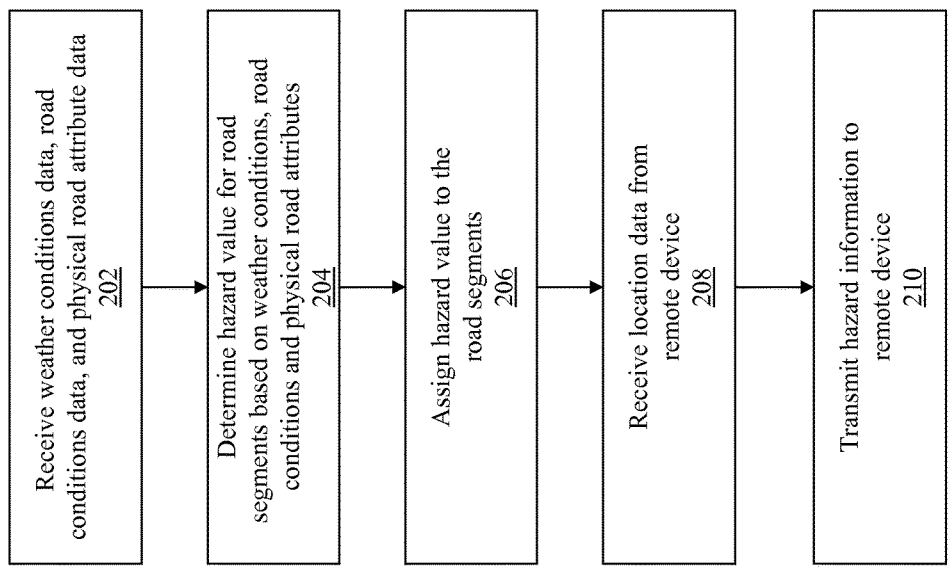
FIG. 2 is a workflow diagram of an exemplary method for conveying vehicle driving information, according to an illustrative embodiment of the invention.

FIG. 2 is a workflow diagram 200 of an exemplary method for conveying vehicle driving information associated with the system 100, according to an illustrative embodiment of the invention. The data communication module 110 receives (202) weather conditions data and physical road attribute data from one or more data sources (e.g., data sources 108a-108c). The hazard index generation module 112 generates a hazard index for a plurality of road segments by determining (204) a hazard value for one or more road segments based on the forecast weather data, the weather conditions data as well as the physical road attribute data, and assigning (206) the hazard value to the corresponding road segment. A user (e.g., the driver of a vehicle) utilizes a remote device 102 (e.g., a GPS navigation device) to transmit location data to the server 106 via the communications network 104, and the server 106—via the data communication module 110—receives (208) the location data. The data communication module 110 transmits (210) hazard information based on the location data and the hazard index back to the remote device 102.

In some embodiments, the data communication module 110 continually receives data from the respective data sources 108a-108c without actively requesting the data. As a result, the hazard index generation module 112 continuously updates the hazard values based on the most current weather conditions data, road conditions data, and physical road attributes, and constantly assigns the hazard values to selected road segments. In a preferred embodiment, the system 100 generates the hazard index for all of the road segments in a predefined coverage area at the same time. For example, the predefined coverage area could be the entire United States, and the system 100 determines hazard values for each of the road segments comprising the various roads within the U.S. and assign the values to the road segments to generate the hazard index. The hazard index is updated at regular intervals (e.g., each minute). Later, when a remote device 102 transmits location data to the data communication module 110, the hazard index generation module 112 determines and assigns the specific hazard value associated with that location without first retrieving the necessary data from one or more of the data sources 108a-108c. This technique provides the advantage of increasing the efficiency and speed of the system 100 because the hazard index and its associated hazard values have already been generated, and the system 100 transmits the hazard information to the remote device 102 without incurring substantial processing costs.

In some embodiments, the hazard index generation module 112 assigns an identifier to each of the plurality of road segments. In some embodiments, the identifier is a system-defined value, such as an identification number or code, to allow the system to conduct data transactions associated with a specific road segment quickly and efficiently. The identifier can be stored in a data storage device as part of the hazard index.

In generating the hazard index for the plurality of road segments, the hazard index generation module 112 considers many different factors, which are separated into three broad categories: weather conditions, road conditions, and physical road attributes. The hazard index generation module 112 is not limited to factors associated with these categories, and the module 112 considers other factors related to road safety, such as traffic conditions or road configurations. Specific data elements from the categories are used to determine the hazard value. In some embodiments, the hazard index generation module 112 determines a hazard value without requiring data elements from all categories. In some embodiments, the respective data elements used to determine the hazard value are assessed differently, for example, by assigning one or more weighted coefficients to each data element based on a predetermined algorithm or determination scheme. Further detail about the determination of the hazard value and the weighted coefficient is described below.

The weather condition data elements correspond to current and forecast weather activity associated with the location of one or more road segments. The weather condition data elements can be provided by a weather information service such as the WeatherBug® family of applications provided by Earth Networks, Inc. of Germantown, Md. In some embodiments, the data elements provided by the weather information service are obtained, for example, from a network of weather sensors geographically distributed to cover a specific area or even the entire country. The weather condition elements include but are not limited to precipitation (e.g., rain, snow, sleet, etc.), wind speed, wind direction, fog, humidity, sun position, barometric pressure, surface temperature, temperatures aloft, cloud cover, smoke/ash from nearby fires, and severe weather events (e.g., hurricanes, tornadoes, lightning, etc.).

Any of the weather condition elements can be evaluated temporally. For example, the data communication module 110 receives from a data source (e.g., data source 108a) a timestamp or start/end times associated with a rainfall event. When the hazard index generation module 112 evaluates the rainfall event for incorporation into a hazard value, the time at which the rainfall occurred helps the hazard index generation module 112 make a more accurate determination of the dangerousness of a particular road segment. The hazard index generation module 112 determines that recently-started rainfall could contribute, for example, to a build-up of oily residue on the road surface—and therefore the hazard index generation module 112 assigns a different hazard value than if the rainfall had been occurring for a longer period of time or had stopped forty-five minutes ago, allowing the road to dry out. Similarly, the hazard index generation module 112 factors rates of precipitation into the determination of a hazard value. For example, upon receiving information that snow is currently falling at the rate of one inch per hour in a specific location, the hazard index generation module 112 assigns a higher hazard value to that location than if the snow only fell at one-quarter of an inch per hour.

Another type of weather condition data element which can be used by the hazard index generation module 112 to determine a hazard value is historical or forecast weather data. For example, the data communication module 110 receives information from a weather service (e.g., 108a) that a severe thunderstorm is expected to travel through a location in the next thirty minutes, the hazard index generation module 112 incorporates the forecast into the hazard value determination for that location. In some embodiments, the data communication module 110 receives information that the occurrence of flooding in a particular location has historically been greater, for example, during certain months of the year or when certain weather conditions exist. The hazard index generation module 112 subsequently assigns a higher hazard value to that location depending on whether the historical criteria have been met.

The road conditions data correspond to external factors affecting the safety of the road surface associated with a specific location. In some embodiments, the road conditions data are provided by, for example, a governmental source such as the U.S. Department of Transportation. Such road conditions data elements include but are not limited to road temperature, salinity associated with the road surface, accumulation of precipitation (e.g., ice, slush, snow, rainwater) on the road surface, accumulation of other elements (e.g., oil film, chemical film) on the road surface.

The physical road attribute data elements correspond to the layout, orientation, and composition of roads associated with a specific location. In some embodiments, the physical road attribute data elements are provided by a data service from companies such as Tele Atlas or ESRI, or from a governmental source such as the U.S. Department of Transportation. Such physical road attribute data elements include but are not limited to slope, surface angle, surface composition (e.g., asphalt, gravel, etc.), solar orientation (e.g., position of the sun in relation to the road surface), and topography.

To determine a hazard value for one or more road segments, the hazard index generation module 112 evaluates one or more data elements received from any of the data sources 108a-108c. In some embodiments, the data elements are evaluated according to a plurality of different algorithms, and the data elements are weighted differently, for example, according to predetermined thresholds or the satisfaction of minimum requirements. In one embodiment, the hazard value of a road segment increases based on the amount of snowfall in the past twelve hours. The hazard index generation module 112 assigns (206) a low hazard value if the amount of snowfall is less than half an inch, a moderate hazard value if the amount of snowfall is between half an inch and three inches, and a high hazard value if the amount of snowfall is between three and eight inches. The hazard value assigned based on the snowfall is compared with hazard values for other data elements like road conditions and/or physical road attributes to generate an overall hazard value for that road segment. Other examples of predetermined thresholds include the radar density associated with precipitation in a particular area or road segment and a road surface temperature above or below a certain predefined value The thresholds are defined based on historical weather conditions data, standardized minimum safe driving conditions information, user-defined criteria, or other similar methods.

In some embodiments, the hazard index generation module 112 evaluates all of the data elements associated with a road segment and determines a single hazard value based on a combination of the respective data elements. For example, the data communication module 110 receives information from the data sources 108a-108c that three inches of snow has fallen in the past two hours on a road segment consisting of an asphalt surface with a temperature of 15 degrees F. The hazard index generation module 112 assigns a severe hazard value to that road segment. In another embodiment, the data communication module 110 receives information from the data sources 108a-108c that the weather is clear and calm on an asphalt road segment with a temperature of 72 degrees F. The hazard index generation module 112 assigns a low hazard value to that road segment.

Once the hazard index generation module 112 has assigned a hazard value to a particular road segment, the hazard index generation module 112 continually monitors the data elements associated with that road segment received by the data communication module 110 to determine if the hazard value should be upgraded or downgraded. The hazard index generation module 112, for example, gradually reduces the hazard value if the weather conditions associated with the road segment improve (e.g., heavy rainfall subsides) or if a predetermined time value elapses since the data communication module 110 last received information indicating a weather event (e.g., four hours have passed since rainfall had ended). The hazard index generation module 112 also evaluates the current data elements against a series of minimum requirements which must be met before the hazard value is reduced or eliminated. For example, a severe hazard value associated with rainfall at a specific road segment is maintained by the hazard index generation module 112 until information is received by the data communication module 110 from the data sources 108a-108c that the relative humidity in the area has dropped below 85 percent and no rainfall has occurred for thirty minutes, indicating that a road surface has dried. In one embodiment, a hazard value associated with wind gusts is maintained by the hazard index generation module 112 until information is received by the data communication module 110 from the data sources 108a-108c that no wind gust has been recorded above 30 miles per hour for the last fifteen minutes during the summer months and for the last two hours in the winter months. In other embodiments, the hazard index generation module 112 removes an assigned hazard value altogether if the conditions meet a predetermined threshold.

In some embodiments, the hazard index generation module 112 assigns (206) a hazard value to a particular road segment based on a predictive evaluation of the data elements associated with that road segment. The hazard index generation module 112 also evaluates data elements associated with road segments in proximity to the targeted road segment in order to conduct a predictive evaluation. The hazard index generation module 112, for example, determines that the current location and predicted movement of a weather event (e.g., a localized cell of heavy rainfall) will impact a particular road segment in thirty minutes. The hazard index generation module 112 assigns a low current hazard value to the road segment because the severe weather is not overhead at the present time. The hazard index generation module 112 also assigns a high "future" hazard value to the same road segment based on the approach of the weather event.

In some embodiments, the data communication module 110 transmits the current hazard value and/or the future hazard value as an alert to a remote device. For example, the hazard index generation module 112 determines that each road segment along a user's travel route currently has a low hazard value, but the hazard value of a road segment at which the user will arrive in 30 minutes will change to 'high' at approximately the same time the user arrives. The data communication module 110 transmits an alert to the user's remote device 102 indicating that severe weather is likely to impact the travel route in the future. The user can then decide whether to continue along the same route, seek an alternate route, or stop driving until the future hazard value returns to 'low'.

In some embodiments, the hazard index generation module 112 generates a hazard zone by retrieving hazard values associated with road segments in a zone surrounding the current location of a weather event. For example, the hazard index generation module 112 determines that a severe thunderstorm has appeared at a particular geographical location. The hazard index generation module 112 assembles all of the road segments in proximity to the thunderstorm into a hazard zone. Generation of the hazard zone can incorporate both current weather conditions data and forecast weather conditions data.

In determining which road segments to include in the hazard zone, the hazard index generation module 112 identifies road segments within a predefined geographical area extending outward from the weather event. For example, the hazard index generation module 112 identifies all road segments within a five-mile radius from the weather event to include in a hazard zone. As a result, in some embodiments, the hazard index generation module 112 increases the hazard value associated with road segments included in a hazard zone. Alternatively, because most of the road segments within a hazard zone may not be directly affected by the weather event, the hazard index generation module 112 leaves the respective hazard value for those road segments unchanged.

The hazard index generation module 112 can define the relative hazard values in different ways. In some embodiments, the hazard value is indicated by a color representing the severity of the hazard associated with a specific road segment (e.g., the color green indicates a low hazard value, the color red indicates a high hazard value). In some embodiments, the assigned hazard value is indicated by a word (e.g., clear, caution, severe), a number (e.g., 1 indicates a low hazard value, 5 indicates a high hazard value), or any similar indicator. In a preferred embodiment, the hazard values are placed on a relative scale to indicate the level of severity when compared to each other, although the hazard values can be represented as independent values.

Once the hazard index generation module 112 has generated the hazard index, the server 106—via the data communications module 110—receives location data from remote devices (e.g., remote device 102) in order to transmit hazard information to the devices. The location data includes position coordinates, address data, or other information to determine the current location of the remote device 102. In some embodiments, the location data also includes parameters associated with the scope of the remote device's 102 data request. For example, the remote device 102 is a GPS navigation device, which may want to display the hazard values for nearby streets. The location data includes a request to limit the hazard values returned by the server 106 to the surrounding local area. Alternatively, the remote device 102 can be a personal computer, which may want to display the hazard values for a larger regional area. The location data includes a request to include a broader view of assigned hazard values, for example, for fleet management operations.

After the data communications module 110 receives the location data, the hazard index generation module 112 analyzes the hazard index using the location data to retrieve the hazard values associated with road segments at or near the location. In one embodiment, the hazard index generation module 112 retrieves hazard values corresponding to one or more road segments on which the remote device 102 is currently located or traveling.

The module 112 also determines whether the location data is associated with a road segment within a hazard zone and, upon determining that the remote device 102 is at a location within the hazard zone, the module 112 transmits hazard information to the remote device 102. In this respect, the hazard zone acts as a 'buffer' to inform drivers of potentially dangerous conditions well in advance of any encounter with the weather event. For example, a driver using a GPS device (e.g., 102) connected with the system 100 may be traveling on a road that might lead him directly toward a severe snowstorm. As the driver gets within a predetermined distance (e.g., 5 miles) of the snowstorm's location, the hazard index generation module 112 determines that the device 102 has crossed the edge of the hazard zone. Accordingly, the data communication module 110 transmits hazard information, such as an alert message, to the remote device 102 indicating the approaching conditions. The driver can then quickly make a decision on whether to pursue alternate routes or to pull off the road until the snowstorm subsides.

Once the hazard index generation module 112 has analyzed the hazard index based on the received location data, the module 112 transmits hazard information back to the remote device 102. The hazard information includes one or more of the hazard values retrieved from the hazard index, one or more alert messages, or one or more graphical representations of road segments associated with the hazard values.

Figure 3:
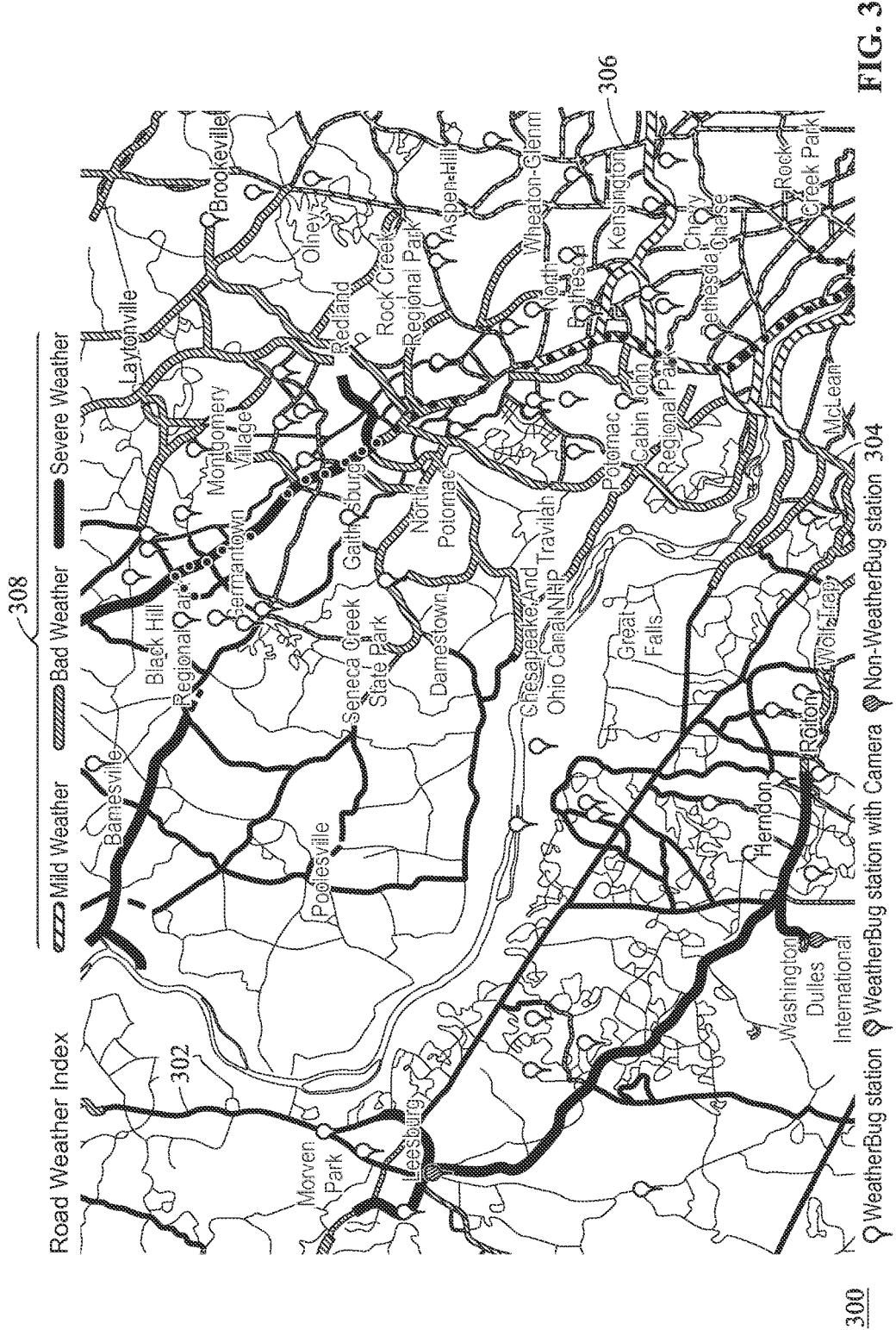
FIG. 3 is a screenshot of a graphical representation of a road map containing one or more road segments colored to indicate an assigned hazard value, according to an illustrative embodiment of the invention.

For example, the hazard index generation module 112 generates a graphical representation of the road segments coded with the corresponding hazard values. FIG. 3 is a screenshot of a graphical representation of a road map containing one or more road segments colored to indicate an assigned hazard value, according to an illustrative embodiment of the invention. Each of the road segments (e.g., road segments 302, 304, 306) in FIG. 3 is associated with a specific color which indicates the assigned hazard value. For example, the road map contains a road segment 302 running north-south which is colored red. Referring to the map legend 308, the color red is associated with a 'severe weather' hazard value. Other road segments 304 and 306 are colored yellow to indicate a 'bad weather' hazard value and green to indicate a 'mild weather' hazard value, respectively.

In some embodiments, the road map encompasses different areas of coverage. For example, the road map can be displayed at a localized level (e.g., a neighborhood or street view), a regional level (e.g., a city or metropolitan area), or a national level. The hazard index generation module 112 can generate multiple road maps for display on the remote device 102.

In some embodiments, the data communication module 110 transmits an alert to a remote device 102 based on the hazard value assigned to a current location of the remote device 102. The alert can include an indicator reflecting the hazard value of a road segment on which the remote device is located.

Figure 4A:
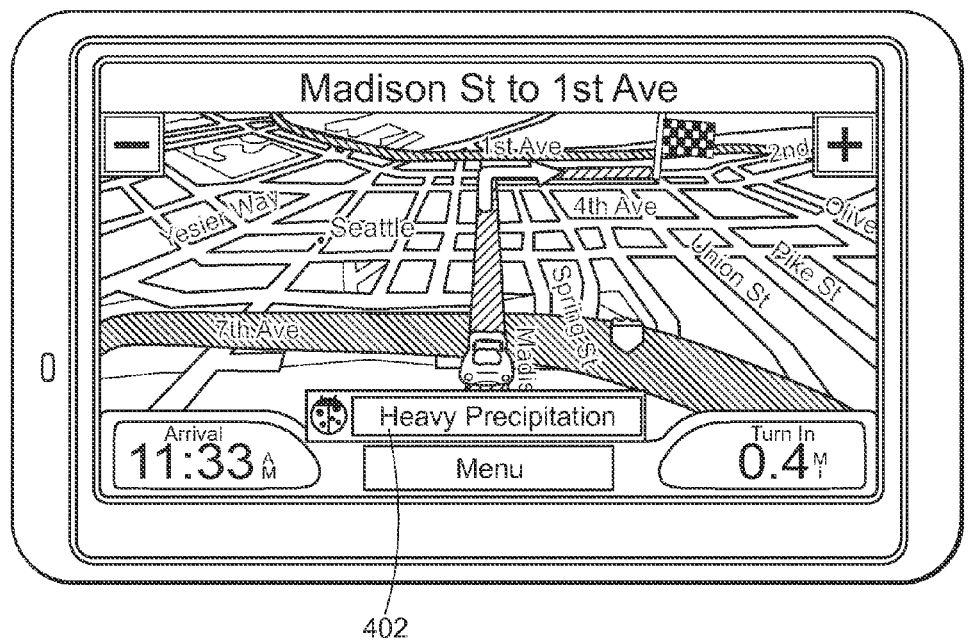
FIGS. 4A-4B are screenshots of a graphical representation of a road map displayed on a remote device containing one or more sections colored to indicate an assigned hazard value, according to an illustrative embodiment of the invention.
Figure 4B:
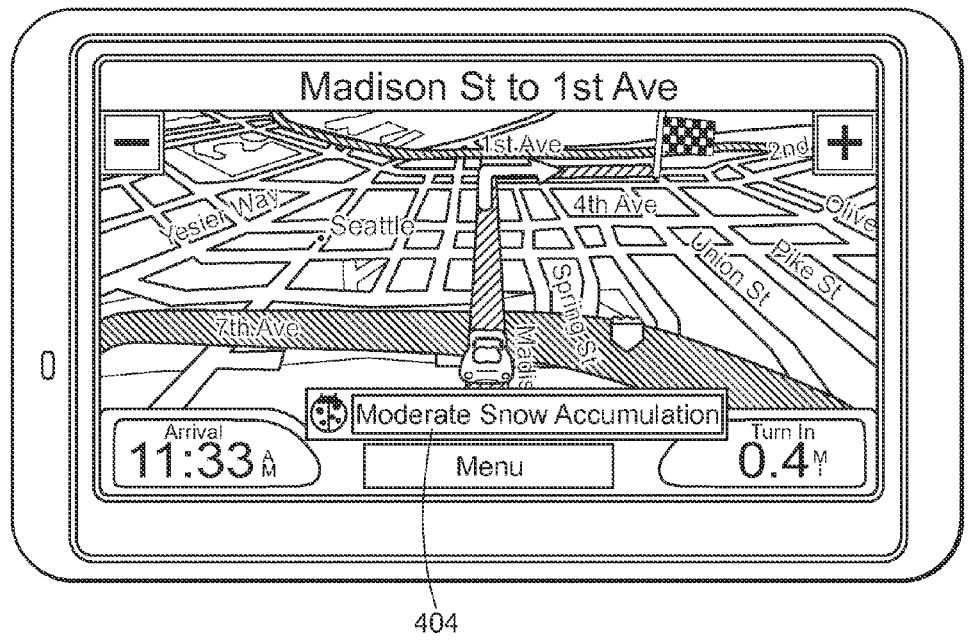

FIGS. 4A-4B are screenshots of a graphical representation of a road map displayed on a remote device containing an alert message associated with the hazard index, according to an illustrate embodiment of the invention. In FIG. 4A, the remote device 102 receives an alert 402 from the data communication module 110 indicating that heavy precipitation is occurring along the road segment (e.g., Madison Street) at the remote device's 102 current location. In addition, the alert 402 is colored red to indicate to the user, for example, a severe hazard value associated with the alert 402. The user can then decide whether to continue along the same route, seek an alternate route, or stop driving until the hazard has subsided. In FIG. 4B, the remote device 102 receives an alert 404 from the data communication module 110 indicating that moderate snow accumulation has occurred along the road segment (e.g., Madison Street) at the remote device's 102 current location. The alert 404 is colored yellow to indicate to the user, for example, a caution hazard value associated with the alert.

Figure 5:
FIG. 5 is a screenshot of a text table containing turn-by-turn driving directions associated with a color to indicate an assigned hazard value, according to an illustrative embodiment of the invention.

FIG. 5 is a screenshot 500 of a text table containing turn-by-turn driving directions associated with a color to indicate an assigned hazard value, according to an illustrative embodiment of the invention. A user sitting at a personal computer (e.g., remote device 102) connects to the server 106 via browser software. The user enters, for example, a starting address and an ending address and transmit a request to the server 106 for turn-by-turn driving directions. In determining an optimal route and generating the directions, the hazard index generation module 112 assigns a hazard value to each road segment included as part of the determined route. The hazard index generation module 112 generates a text table containing both the driving directions and an indication of the hazard value for display on the remote device 102. For example, the row containing the first driving direction 502a (e.g., row one) in the text table also contains a colored square 504a indicating that the road segment associated with that direction has a low (e.g., green) hazard value. The driving direction row 502 also includes more detailed information 506a, such as the current weather conditions (e.g., sunny/clear) and temperature (e.g., 50 degrees) for that road segment. A subsequent driving direction row 502b (e.g., row twenty-one) contains a square 502b colored red to indicate a severe hazard value, along with a raincloud 504b and a temperature reading 506b. The user can quickly see that the weather conditions deteriorate along the travel route, as the hazard value increases accordingly.

Use Case 1

As one example, John is at the wheel of his automobile which is equipped with a remote device 102 (e.g., a GPS navigation device) in communication with a server 106 over a communications network 104, according to the above-referenced techniques. The device 102 includes a screen for displaying a road map containing John's current location and nearby streets. His device 102 transmits the current location (e.g., traveling on Madison Street) of his vehicle to the communication network 104. The current location is determined using global positioning techniques known in the art. The data communication module 110 receives the location data and the hazard index generation module 112 retrieves one or more hazard values from the hazard index for the portion of the road on which Joe is currently traveling, or will be traveling.

For example, the hazard index generation module 112 determines that John is currently driving on road made of asphalt. The hazard index generation module 112 also determines that the current weather is clear and sunny, and there have been no recent weather events associated with that section of road. The hazard index generation module 112 has previously evaluated all of the physical road attributes, road conditions data, and weather conditions data associated with John's current location and has assigned a low hazard value (e.g., 'Green') to the section of road. The hazard index generation module 112 generates a road map display which contains the road segment colored green to indicate the hazard value. In other embodiments, the hazard index generation module 112 generates a road map display with an associated text message indicating an alert message (e.g., "Clear" or "Heavy Precipitation") corresponding to the assigned hazard value. The alert message can be color-coded to indicate the hazard value. The data communication module 110 transmits the display and/or alert message back to the device 102 in John's car. John can then look at the display on his device 102 and quickly see that he is traveling on a section of road that has a low hazard.

Use Case 2

As another example, Sally is at home in front of her remote device 102 (e.g., a personal computer or smart phone) in communication with a server 106 over a communications network 104, according to the above-referenced techniques. The device 102 includes a display device (e.g., a monitor) and browser software. Sally accesses a travel website to view the route associated with her daily commute. The data communication module 110 receives information about Sally's commuter route. The hazard index generation module 112 assigns a hazard value to each of the road segments associated with her route and generates a graphical representation of the roads she uses. The data communication module 110 transmits the graphical representation of the route back to Sally's computer. Sally then sees that a hazard value of "Red—Severe" is assigned to the main highway she normally drives on her commute, due to heavy snowfall along the route. Sally can then plan an alternate route or delay her travel to work, thereby avoiding the dangerous conditions on that section of road.

The above-described systems and methods can be implemented in digital electronic circuitry, in computer hardware, firmware, and/or software. The implementation can be as a computer program product (i.e., a computer program tangibly embodied in a computer readable storage medium). The implementation can, for example, be in a machine-readable storage device and/or include a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array), an ASIC (application-specific integrated circuit), a DSP (digital signal processor), and/or any other discrete circuitry that is configured to implement the required functions. Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Computer readable mediums suitable for embodying computer program instructions and data include all forms of non-volatile memory, including by way of example semiconductor memory devices. The computer readable mediums can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device or a transmitting device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The client device and the computing device can include, for example, a computer, a computer with a browser device, a telephone, an IP phone, a mobile device (e.g., cellular phone, personal digital assistant (PDA) device, smart phone, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

The web servers can be, for example, a computer with a server module (e.g., Microsoft® Internet Information Services available from Microsoft Corporation, Apache Web Server available from Apache Software Foundation, Apache Tomcat Web Server available from Apache Software Foundation).

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network).

The system can include clients and servers. A client and a server are generally remote from each other and typically interact through a communication network. The relationship of client and server arises by virtue of computer programs running on the respective computers and having a client-server relationship to each other.

The above described communication networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A computerized method for conveying vehicle driving information, the method comprising:
    generating, by a server computing device, a hazard index for a plurality of road segments in a predefined coverage area, wherein the hazard index indicates a level of driving safety, the generating comprising:
        determining a current hazard value for each of the plurality of road segments based on (i) weather conditions data associated with the road segments, (ii) road conditions data associated with the road segments, the road conditions data comprising a temperature of the road surface, accumulation of precipitation on the road surface, and accumulation of organic or inorganic substances on the road surface, and (iii) physical attributes of the road segments, the physical attributes comprising slope, surface angle, composition of surface materials, solar orientation, and topography;
        wherein each of the weather conditions data, road conditions data, and physical attributes used to determine the current hazard value are assigned different weighted coefficients based on a comparison of the respective data to predetermined thresholds;
        determining a predicted hazard value for each of the plurality of road segments, wherein the predicted hazard value is based on the weather conditions data associated with the road segments, the road conditions data associated with the road segments, and the physical attributes of the road segments, wherein the predicted hazard value represents a level of driving safety for the road segment at a future point in time; and
        assigning the present hazard value and the predicted hazard value to the corresponding road segment;
    receiving, by the server computing device, location data associated with a remote device; and
    transmitting, to the remote device, hazard information associated with one or more of the plurality of road segments based on the location data and the hazard index.

2. The method of claim 1, wherein the step of generating a hazard index includes assigning a system-defined identifier to each of the one or more road segments to allow the server computing device to execute data transactions associated with an individual road segment.

3. The method of claim 1, further comprising generating, by the server computing device, a hazard zone based on the hazard index, wherein the hazard zone comprises a geographical area in proximity to a weather event.

4. The method of claim 3, wherein the hazard information is transmitted to the remote device when the received location data is associated with a road segment within the hazard zone.

5. The method of claim 4, wherein the geographical area includes locations at a predetermined distance from the location of the weather event.

6. The method of claim 1, wherein the hazard index is updated at regular intervals.

7. The method of claim 6, wherein the hazard index is updated every minute.

8. The method of claim 1, wherein the hazard information includes one or more hazard values, one or more alert messages, one or more graphical representations of the road segments, or any combination thereof.

9. The method of claim 8, wherein the one or more graphical representations include a road map.

10. The method of claim 9, wherein the road map includes one or more road segments colored to indicate the assigned hazard value.

11. The method of claim 9, wherein the one or more graphical representations include a grid.

12. The method of claim 11, wherein the grid includes one or more sections colored to indicate the assigned current hazard value.

13. The method of claim 11, wherein the grid includes one or more sections colored to indicate the assigned future hazard value.

14. The method of claim 8, wherein the one or more graphical representations includes a text table.

15. The method of claim 14, wherein the text table includes driving directions colored to indicate the assigned current hazard value.

16. The method of claim 14, wherein the text table includes driving directions colored to indicate the assigned future hazard value.

17. The method of claim 1, wherein the weather conditions data includes a time value associated with a weather event.

18. The method of claim 1, wherein the road segments represent segments of major highways and secondary highways.

19. The method of claim 1, further comprising storing the hazard index in a storage device.

20. The method of claim 1, further comprising:
    determining, by the server computing device, one or more travel routes based upon the hazard index; and
    transmitting, to the remote device, the one or more travel routes.

21. The method of claim 20, further comprising ranking, by the server computing device, the one or more travel routes according to the present hazard values and the future hazard values assigned to the road segments that comprise the travel route.

22. The method of claim 21, wherein the server computing device transmits one or more travel routes that are assigned future hazard values falling below a predetermined threshold.

23. The method of claim 20, further comprising:
    updating, by the server computing device, the one or more travel routes based upon changes occurring over time to the present hazard values and the future hazard values; and
    transmitting, by the server computing device, the updated travel routes to the remote device.

24. A system for conveying vehicle driving information, the system comprising a server computing device configured to:
  generate a hazard index for a plurality of road segments in a predefined coverage area, wherein the hazard index indicates a level of driving safety, the generating comprising:
    determining a current hazard value for each of the plurality of road segments based on (i) weather conditions data associated with the road segments, (ii) road conditions data associated with the road segments, the road conditions data comprising a temperature of the road surface, accumulation of precipitation on the road surface, and accumulation of organic or inorganic substances on the road surface, and (iii) physical attributes of the road segments, the physical attributes comprising slope, surface angle, composition of surface materials, solar orientation, and topography;
    wherein each of the weather conditions data, road conditions data, and physical attributes used to determine the current hazard value are assigned different weighted coefficients based on a comparison of the respective data to predetermined thresholds;
    determining a predicted hazard value for each of the plurality of road segments, wherein the predicted hazard value is based on the weather conditions data associated with the road segments, the road conditions data associated with the road segments, and the physical attributes of the road segments, wherein the predicted hazard value represents a level of driving safety for the road segment at a future point in time; and
    assigning the present hazard value and the predicted hazard value to the corresponding road segment;
  receive location data associated with a remote device; and
  transmit, to the remote device, hazard information associated with one or more of the plurality of road segments based on the location data and the hazard index.

25. The system of claim 24, wherein the step of generating a hazard index includes assigning a system-defined identifier to each of the one or more road segments to allow the server computing device to execute data transactions associated with an individual road segment.

26. The system of claim 24, wherein the server computing device is further configured to generate a hazard zone based on the hazard index and wherein the hazard zone comprises a geographical area in proximity to a weather event.

27. The system of claim 26, wherein the hazard information is transmitted to the remote device when the received location data is associated with a road segment within the hazard zone.

28. The system of claim 27, wherein the geographical area includes locations at a predetermined distance from the location of the weather event.

29. The system of claim 24, wherein the hazard index is updated at regular intervals.

30. The system of claim 29, wherein the hazard index is updated every minute.

31. The system of claim 24, wherein the hazard information includes one or more hazard values, one or more alert messages, one or more graphical representations of the road segments, or any combination thereof.

32. The system of claim 31, wherein the one or more graphical representations include a road map.

33. The system of claim 32, wherein the road map includes one or more road segments colored to indicate the assigned hazard value.

34. The system of claim 31, wherein the one or more graphical representations include a grid.

35. The system of claim 34, wherein the grid includes one or more sections colored to indicate the assigned current hazard value.

36. The system of claim 34, wherein the grid includes one or more sections colored to indicate the assigned future hazard value.

37. The system of claim 31, wherein the one or more graphical representations includes a text table.

38. The system of claim 37, wherein the text table includes driving directions colored to indicate the assigned current hazard value.

39. The system of claim 37, wherein the text table includes driving directions colored to indicate the assigned future hazard value.

40. The system of claim 24, wherein the weather conditions data includes a time value associated with a weather event.

41. The system of claim 24, wherein the road segments represent segments of major highways and secondary highways.

42. The system of claim 24, wherein the server computing device is further configured to store the hazard index in a storage device.

43. The system of claim 24, wherein the server computing device is further configured to:
  determine one or more travel routes based upon the hazard index; and
  transmit, to the remote device, the one or more travel routes.

44. The system of claim 43, wherein the server computing device is further configured to rank the one or more travel routes according to the present hazard values and the future hazard values assigned to the road segments that comprise the travel route.

45. The system of claim 43, wherein the server computing device transmits one or more travel routes that are assigned future hazard values falling below a predetermined threshold.

46. The system of claim 43, wherein the server computing device is further configured to:
  update the one or more travel routes based upon changes occurring over time to the present hazard values and the future hazard values; and
  transmit the updated travel routes to the remote device.

47. A computer program product, tangibly embodied in a non-transitory computer readable storage medium, for conveying vehicle driving information, the computer program product including instructions operable to cause a server computing device to:
  generate a hazard index for a plurality of road segments in a predefined coverage area, wherein the hazard index indicates a level of driving safety, the generating comprising:
    determining a current hazard value for each of the plurality of road segments based on (i) weather conditions data associated with the road segments, (ii) road conditions data associated with the road segments, the road conditions data comprising a temperature of the road surface, accumulation of precipitation on the road surface, and accumulation of organic or inorganic substances on the road surface, and (iii) physical attributes of the road segments, the physical attributes comprising slope, surface angle, composition of surface materials, solar orientation, and topography;

wherein each of the weather conditions data, road conditions data, and physical attributes used to determine the current hazard value are assigned different weighted coefficients based on a comparison of the respective data to predetermined thresholds;

determining a predicted hazard value for each of the plurality of road segments, wherein the predicted hazard value is based on the weather conditions data associated with the road segments, the road conditions data associated with the road segments, and the physical attributes of the road segments, wherein the predicted hazard value represents a level of driving safety for the road segment at a future point in time; and assigning the present hazard value and the predicted hazard value to the corresponding road segment;

receive location data associated with a remote device; and transmit, to the remote device, hazard information associated with one or more of the plurality of road segments based on the location data and the hazard index.

* * * * *